UNITED STATES PATENT OFFICE.

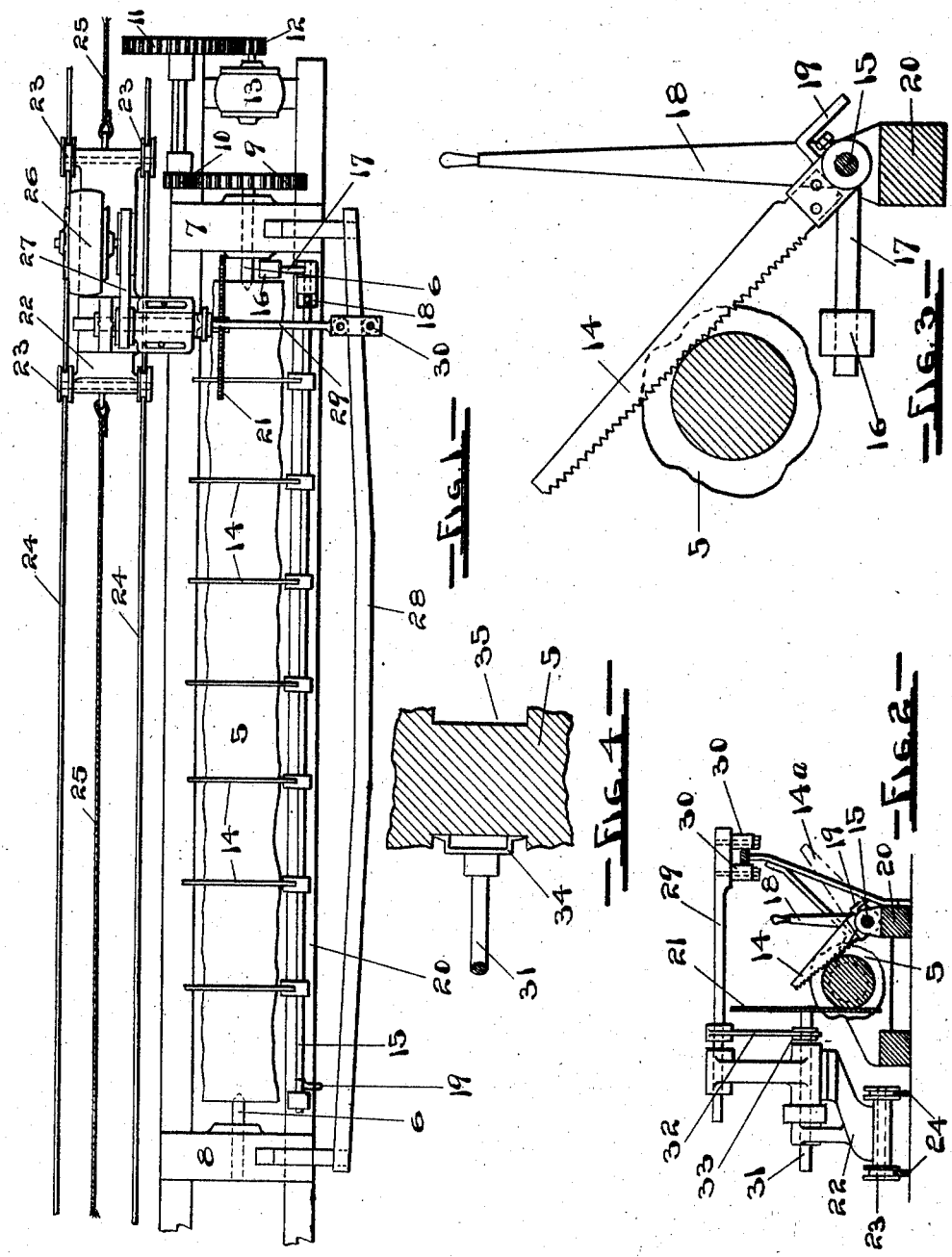

SEBASTIAN PLYMALE, OF PORTLAND, OREGON.

SPAR-FORMING MACHINE.

1,307,699.  Specification of Letters Patent.  Patented June 24, 1919.

Application filed March 11, 1918. Serial No. 221,847.

*To all whom it may concern:*

Be it known that I, SEBASTIAN PLYMALE, a citizen of the United States, residing at Portland, county of Multnomah, State of Oregon, have invented certain new and useful Improvements in Spar-Forming Machines, of which the following is a specification.

My invention relates to spar forming machines in general, and particularly to machines for turning out the spars and masts of ships from the log.

The object of my invention is to provide means whereby the spar or mast may be turned from the log in a manner quicker and cheaper than by present methods, and whereby the waste material may be utilizable for stove wood instead of being shavings as with present methods.

I attain the above object by means of the construction illustrated in the accompanying drawing, which forms a part of this application for Letters Patent, like characters of reference indicating like parts throughout the several views of the drawing, in which:—

Figure 1 is a plan view of my invention.

Fig. 2 is an end elevation of my invention, parts being shown in section.

Fig. 3 is an enlarged view showing details of one of the saws.

Fig. 4 is a diagrammatical view illustrating the use of a cutter head.

In general my invention consists of a lathe, wherein is mounted and revolved the log from which the spar is to be formed, a series of transversely mounted saws adapted to saw annular scarfs upon the log, and a circular saw mounted upon a longitudinally traveling carriage movable parallel to said lathe, said circular saw being adapted to cut a longitudinal scarf in said log.

The log 5 is mounted upon spindles 6 respectively in head stock 7 and tail stock 8, and is driven by gears 9, 10, 11 and 12 and motor 13, as shown in Fig. 1.

In order to scarify the log in parallel scarfs spaced substantially apart a distance equal to the ordinary length of stove wood, I supply a series of transversely disposed saws 14, mounted upon longitudinal shaft 15.

A weight 16 upon an arm 17 on shaft 13 feeds the saws 14 into the log as the latter turns, thereby causing each saw 14 to cut a scarf into the log until said log has been reduced at each point of cutting to the desired diameter, as shown in Figs. 2 and 3, when the saws 14 may be simultaneously withdrawn by operating lever 18 upon shaft 15, which removes the saws 14 from the log and places them in the position 14$^a$ shown in Fig. 2, in which position they are retained by the rest 19 bearing upon the foundation timber 20.

After said saws 14 have performed their function as above explained, the circular saw 21 is brought into operation to cut a longitudinal scarf in the log.

The log is rotated very slowly, about one eighth of a revolution while the saw 21 completes a journey from one end of the log to the other, the saw 21 thereby being required to make eight trips the length of the log to sever all the waste material and leave the spar required.

The saw 21 is made large enough to extend entirely through the log, as shown in Fig. 2, and the teeth thereof are given sufficient set to enable the saw to clear itself in its scarf as the log turns very slowly.

By this method the waste material is separated from the log in the form of stove wood, and the remaining part of the log is the roughed out spar or mast.

To operate the saw 21 I mount the same upon a carriage 22 traveling upon wheels 23 mounted upon tracks 24, the carriage being propelled by any manner, as by cables 25 operated from an outside source of power.

The saw 21 is rotated by a motor 26 mounted upon carriage 22 and connected by belt 27 to the saw arbor.

In order to cut various forms of spars, masts, etc., I mount a longitudinally disposed pattern 28 in a convenient position adjacent the lathe, and upon the carriage 22 I mount an arm 29 extending transversely across said pattern.

Upon said arm 29 I mount rollers 30, one each side of pattern 28, thereby causing arm 29 to reciprocate transversely of pattern 28 and parallel to saw arbor 31, to which arbor arm 29 is connected by rod 32 and clutch ring 33, so as to allow saw arbor 31 to rotate independently of rod 32 but to reciprocate simultaneously therewith and with arm 29.

By this construction the saw 21 follows a path parallel to pattern 28 as said saw travels longitudinally along the log, and it is thereby caused to cut from the log a spar conforming in shape to the shape of said pattern.

As long logs will require a steady rest at or near the center thereof I provide that saw 21 may be removed from arbor 31 and a cutter head 34 mounted thereon, as shown in Fig. 4.

Said cutter head 34 rotating rapidly as the log also rotates, thereby cuts a groove 35 in said log within which groove a steady rest may be made to ride if desired.

My invention may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents or substitutes that may fairly be considered to come within the scope and purview of my invention as defined in the appended claims.

Having disclosed my invention so that others skilled in the art may be enabled to construct and to use the same, what I claim as new, and desire to secure by Letters Patent is:—

1. In a device for cutting spars from a log, means for rotatively mounting said log; means for simultaneously cutting a plurality of annular scarfs in said log; and a rotary cutter longitudinally movable along said log, and rotating upon an axis perpendicular to the axis of said log.

2. In a device for cutting spars from a log, means for rotatively mounting said log; a plurality of transversely mounted saws adapted to cut a plurality of annular scarfs upon said log; a circular saw adapted to cut a longitudinal scarf upon said log; and a longitudinally movable saw carriage supporting said circular saw.

3. In a device for cutting spars from logs, a head-stock; a tail-stock; means to mount a log therebetween; means to rotate said log; a carriage adjacent said log; means to effect the travel of said carriage parallel to said log; a saw arbor mounted upon said carriage and transversely disposed relative to said log; means to rotate said saw arbor; a circular saw mounted upon said arbor adapted to longitudinally scarf said log; and a plurality of saws adapted to transversely scarf said log.

4. A device for forming round spars from logs, comprising a lathe wherein to rotatively mount said log; means to cut a plurality of annular transversely disposed scarfs upon said log; and means thereafter to cut a plurality of longitudinal scarfs upon said log as it revolves, said longitudinal scarfs intersecting said annular scarfs for the purpose of removing the waste material.

In witness whereof I claim the foregoing as my own I hereunto set my signature in the presence of two subscribing witnesses, at Portland, county of Multnomah, State of Oregon, this 25th day of Feby., 1918.

SEBASTIAN PLYMALE.

Witnesses:
L. J. ROBINSON,
C. F. BLAKE.

Copies of this patent may be obtained for five cents each, by addressing the "Commissioner of Patents, Washington, D. C."